United States Patent
Di Bella

[15] 3,673,257
[45] June 27, 1972

[54] PROCESS FOR THE PRODUCTION OF AROMATIC HYDROXYALDEHYDES

[72] Inventor: Eugene P. Di Bella, Rochelle Park, N.J.
[73] Assignee: Tenneco Chemicals, Inc.
[22] Filed: Feb. 2, 1970
[21] Appl. No.: 8,029

[52] U.S. Cl. ........................................... 260/600, 260/566 B
[51] Int. Cl. ........................................................ C07c 45/16
[58] Field of Search ................................................. 260/600

[56] References Cited

UNITED STATES PATENTS 2,676,189   4/1954   Britton et al. ........................... 260/600
3,321,526   5/1967   Marchand et al. ...................... 260/600

*Primary Examiner*—Bernard Helfin
*Attorney*—Daniel J. Reardon, George E. Lilly and Evelyn Berlow

[57] ABSTRACT

Salicylaldehyde and other hydroxybenzaldehydes are prepared by the oxidation of a hydroxybenzyl alcohol in the presence of a platinum catalyst and a cationic oxidation promoter. Among the most effective oxidation promoters are cadmium, cerium, indium, and lanthanum ions.

15 Claims, No Drawings

PROCESS FOR THE PRODUCTION OF AROMATIC HYDROXYALDEHYDES

This invention relates to a process for the production of aromatic hydroxyaldehydes. More particularly, it relates to a process for the production of salicylaldehyde and other hydroxybenzaldehydes by the oxidation of the corresponding hydroxybenzyl alcohols in the presence of a platinum catalyst and a cationic oxidation promoter.

It is known in the art that o-hydroxybenzyl alcohol (saligenin) can be oxidized in the presence of a platinum catalyst to produce salicylaldehyde. The reported processes are generally unsatisfactory for use on a commercial scale because they require the use of large amounts of the catalyst if the necessary reaction rate is to be attained, they give low yields of salicylaldehyde, and under certain conditions salicylic acid rather than salicylaldehyde is formed. In U.S. Pat. No. 2,676,189 Britton and Head stated that when saligenin was oxidized under a variety of conditions using a platinum or platinum oxide catalyst, it was not possible to convert more than fifteen percent of the saligenin to salicylaldehyde. Marchand and Genet reported in U.S. Pat. No. 3,321,526 that when saligenin was oxidized in the presence of boric acid and a platinum catalyst a 12.5 percent yield or salicylaldehyde was obtained, whereas when a palladium catalyst was used under the same conditions the yield of salicylaldehyde was 83.5 percent.

In accordance with this invention, it has been found that hydroxybenzyl alcohols can be readily and efficiently converted to hydroxybenzaldehydes by contacting the alcohols with an oxygen-containing gas in the presence of a platinum catalyst and certain cationic oxidation promoters. The use of the cationic oxidation promoters results in a substantial increase in the rate at which the hydroxybenzyl alcohol is oxidized and thus permits a corresponding reduction in the amount of the platinum catalyst that must be used to achieve a commercially-feasible rate of reaction.

In the process of this invention, a hydroxybenzyl alcohol is oxidized with an oxygen-containing gas in an aqueous medium in the presence of a platinum catalyst and a cationic oxidation promoter to obtain a good yield of the corresponding hydroxybenzaldehyde.

The hydroxybenzyl alcohols that may be oxidized by this process may be represented by the structural formula

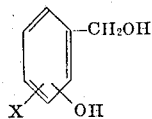

wherein the hydroxyl group may be in the 2-, 3-, or 4-position of the aromatic nucleus and X represents hydrogen, a lower alkyl group, or a lower alkoxy group. Illustrative of these compounds are the following: o-hydroxybenzyl alcohol, m-hydroxybenzyl alcohol, p-hydroxybenzyl alcohol, 2-hydroxy-4-methylbenzyl alcohol, 2-hydroxy-5-butylbenzyl alcohol, 2-hydroxy-6-methoxybenzyl alcohol, 2-hydroxy-4-ethoxybenzyl alcohol, 3-hydroxy-5-methoxybenzyl alcohol, 3-hydroxy-6-methylbenzyl alcohol, 3-methyl-4-hydroxybenzyl alcohol, 2-butoxy-4-hydroxybenzyl alcohol, and the like. The process is of particular value in the oxidation of o-hydroxybenzyl alcohol to salicylaldehyde.

The oxidation process of this invention is carried out by passing oxygen or an oxygen-containing gas, such as air, into a dilute aqueous solution of the hydroxybenzyl alcohol that contains a platinum catalyst and a cationic oxidation promoter until the theoretical amount of oxygen has been absorbed. The catalyst and insoluble cationic oxidation promoter are separated from the reaction mixture, which is then acidified with a mineral acid. The hydroxybenzaldehyde is then isolated, for example, by steam distillation. It may be purified by distillation, extraction with a solvent, recrystallization, or other known methods.

The oxidation catalysts that may be used in the practice of the invention include platinum black and metallic platinum. To reduce the cost of the catalyst, the platinum is generally deposited on an inert carrier, such as carbon, alumina, graphite, silica gel, barium sulfate, or calcium carbonate. Catalysts that contain from about 3 to 10 percent by weight of platinum on a carrier are particularly useful. The amount of platinum catalyst used is that which will cause the oxidation to take place at the desired rate; it is dependent upon such factors as the choice of hydroxybenzyl alcohol, the choice of promoter and the amount of it that is used, and the form of the catalyst. In most cases the amount of catalyst used is that which will provide about 0.15 to 1.5 grams of platinum per mole of the hydroxybenzyl alcohol with optimum results being obtained when 0.25 to 0.60 gram of platinum is used per mole of the hydroxybenzyl alcohol.

The rate at which the hydroxybenzyl alcohol is oxidized to the corresponding aldehyde can be substantially increased by adding to the reaction mixture a small amount of a cationic oxidation promoter. When one of these promoters is present, the amount of time required for the oxidation to be completed is reduced as much as 80 percent without a reduction in the yield of aldehyde. Alternatively, the use of these promoters makes it possible to reduce the amount of platinum catalyst that is used by more than 85 percent without adversely affecting the reaction rate or yield. These reductions in reaction time and/or the amount of platinum that must be used make this process economically attractive for commercial use.

The compounds that can be used as promoters for the platinum-catalyzed oxidation of hydroxybenzyl alcohols are those that in aqueous solution form cations that have a high positive charge, high electronegativity, no amphoteric character, and no tendency to catalyze competitive oxidation reactions such as quinone formation. Illustrative of these promoters are cadmium, cerium, indium, and lanthanum ions. These ions may be introduced into the reaction mixture as the hydroxides, oxides, chlorides, nitrates, borates, or other salts of these metals. Only a small amount of the promoter need be used. As little as 0.1 mole percent, based on hydroxybenzyl alcohol, will bring about an increase in the rate at which the hydroxybenzyl alcohol is oxidized. Ten percent or more of the promoter may be used, but there is no advantage in the use of these large amounts. In most cases about 0.15 to about 2 mole percent, based on the hydroxybenzyl alcohol, is used.

When the cations are added to the alkaline reaction mixture as the metal chlorides or nitrates, they are converted to the metal hydroxides, which are insoluble in the reaction mixture. Following the oxidation reaction, the insoluble cationic promoters and the catalyst may be recovered by filtration and reused in a succeeding oxidation.

Particularly satisfactory results have been obtained when the tetrammine cadmium ion, $Cd(NH_3)_4^{+2}$, was used to catalyze the oxidation of o-hydroxybenzyl alcohol. This promoter, which is prepared by dissolving cadmium chloride in excess ammonium hydroxide, is soluble in the strongly alkaline reaction mixture. Because of its solubility and because it is effective at levels as low as 0.15 mole percent, based on o-hydroxybenzyl alcohol, the tetrammine cadmium ion is particularly well suited for use as the promoter in oxygenations that are conducted as a column operation in which the catalyst is employed as a fixed bed.

The conditions under which the oxidation reaction is carried out are not critical. Temperatures in the range of about 0° to 100° C. may be used, with temperatures between 20° and 40° C. preferred. The oxidation is ordinarily carried out at atmospheric pressure, but somewhat higher and lower pressures may be used if desired. While the oxidation can be carried out under neutral conditions, it is usually and preferably carried out in an aqueous medium that contains about 0.3 to 3 moles of an alkaline compound, such as sodium hydroxide, sodium borate, potassium borate, or potassium hydroxide, per mole of hydroxybenzyl alcohol. The concentration of the hydroxybenzyl alcohol in the aqueous reaction medium is usually about 10 to 30 percent by weight.

This invention is further illustrated by the following examples. In these examples all parts are parts by weight and all percentages are percentages by weight.

EXAMPLE 1

To a solution prepared from 1.24 parts (0.01 mole) of o-hydroxybenzyl alcohol, 0.87 part (0.022 mole) of sodium hydroxide and 15 parts of water was added 1 part of dilute aqueous solution of either cadmium hydroxide (prepared by adding cadmium chloride to a sodium hydroxide solution) or tetrammine cadmium hydroxide (prepared by dissolving cadmium chloride in excess ammonium hydroxide). Then 0.25 part of 5 percent platinum-on-carbon was added to the solution. The mixture was contacted with oxygen at about one atmosphere pressure at 25°– 30° C. in a closed system using magnetic stirring. The volume of oxygen that reacted was measured with a gas burette.

When 0.005 mole of oxygen had been absorbed, the reaction mixture was filtered to remove the catalyst, diluted with 50 parts of methanol, and acidified with dilute hydrochloric acid. An excess of 2,4-dinitrophenylhydrazine was added, and the insoluble salicylaldehyde derivative (m.p. 252°–254° C.) precipitated. The salicylaldehyde derivative was isolated by filtration, washed with methanol, and air dried at 60° C.

A comparative run in which a promoter was not used was carried out by the foregoing procedure.

The promoters used, the times required for the oxidation, and the yields of the salicylaldehyde-2,4-dinitrophenylhydrazine derivative obtained are set forth in Table I.

TABLE I

| Promoter | Amount of Promoter (Mole %) | Time Required for Absorption of 0.005 Mole O$_2$ (Hours) | Yield (%) |
|---|---|---|---|
| Cadmium Hydroxide | 2.0 | 2 | 96.1 |
| Tetrammine Cadmium Hydroxide | 0.19 | 4 | 87.6 |
| None | — | 41 | 88.8 |

EXAMPLE 2

To a solution prepared from 1.25 parts (0.01 mole) of o-hydroxybenzyl alcohol, 0.87 part (0.022 mole) of sodium hydroxide, 0.62 part (0.01 mole) of boric acid, and 15 parts of water was added 0.02 mole (2.0 mole percent) and one of the promoters listed in Table II, which had been dissolved in one part of water. After the addition of 0.25 part of 5 percent platinum-on-carbon, the mixture was oxidized and the product recovered by the procedures described in Example 1.

The promoters used, the times required for the oxidation, and the yield of salicylaldehyde-2,4-dinitrophenylhydrazine derivative are set forth in Table II.

TABLE II

| Promoter | Time Required for Absorption of 0.005 Mole O$_2$ (Hours) | Yield (%) |
|---|---|---|
| Cadmium chloride | 6.5 | 79.1 |
| Ceric ammonium nitrate | 7 | 64.2 |
| Lanthanum nitrate | 8 | 85.1 |
| Indium nitrate | 9 | 80.4 |
| Copper (I) chloride* | 11 | 67.2 |
| Yttrium nitrate | 14 | 76.2 |
| Magnesium sulfate | 16 | 68.2 |
| Copper (II) sulfate | 17 | 63.2 |
| Uranyl nitrate | 19 | 70.2 |
| Zinc sulfate | 22 | 72.9 |
| None | 25 | 68.5 |

*Added as solid

EXAMPLE 3

To a solution prepared from 37.2 parts (0.3 mole) of o-hydroxybenzyl alcohol, 24 parts (0.66 mole) of sodium hydroxide, and 450 parts of water was added a small amount of 5 percent platinum-on-carbon catalyst alone or in combination with cadmium chloride. The mixture was oxidized by the procedure described in Example 1. The reaction mixture was the filtered, acidified to pH 1 with sulfuric acid, and steam-distilled to separate a fraction that contained more than 99.5 percent of salicylaldehyde.

The amounts of platinum added, the time required for the oxidation, and the yields of salicylaldehyde are set forth in Table III.

TABLE III

| Amount of Platinum Catalyst Added (Parts/Mole) | Promoter | Time Required for Absorption of 0.15 mole Oxygen (Hours) | Yield of Salicylaldehyde (%) |
|---|---|---|---|
| 2.23 | — | 8 | 75.4 |
| 1.25 | — | 11 | 66.0 |
| 0.52 | — | 27 | 65.2 |
| 0.52 | 2.0 mole % of Cadmium Chloride | 6 | 79.3 |

From the data in Table III, it will be seen that when 2.0 mole percent of cadmium ion was present in the reaction mixture, the reaction time was decreased and the yield was increased even though the amount of platinum catalyst used was reduced by 77 percent. During this oxidation run, the cadmium chloride which had been added to the reaction mixture was converted to cadmium hydroxide, which is insoluble in the strongly alkaline system.

EXAMPLE 4

To a solution prepared from 124 parts (1.0 mole) of o-hydroxybenzyl alcohol, 170 parts (2.12 moles) of 50 percent aqueous sodium hydroxide solution, 62 parts (1.0 mole) of boric acid, and 700 parts of water was added a solution of 3.65 parts of cadmium chloride in 20 parts of water. A suspension of cadmium hydroxide formed as the mixture stood at room temperature. After the addition of 10.3 parts of 5 percent platinum-on-carbon catalyst, the reaction mixture was contacted with oxygen at about one atmosphere pressure at 25°–30 C. in a closed system for about 7 hours, during which time about 16 parts (0.5 mole) of oxygen was absorbed. The reaction mixture was filtered to remove the catalyst and promoter, acidified with 110 parts of 96 percent sulfuric acid, and steam-distilled to separate 82 parts of an organic layer. Distillation of this layer yielded 80 parts (0.655 mole) of salicylaldehyde.

This procedure was repeated using other promoters and other amounts of the platinum catalyst.

The results obtained are summarized in Table IV.

TABLE IV

| Amount of Platinum Added (Parts/Mole) | Promoter Added | Time for Absorption of 0.50 mole O$_2$ (Hours) | Yield (%) |
|---|---|---|---|
| 2.23 | None | 7.5 | 65 |

| Amt. | Promoter | Time | Yield |
|---|---|---|---|
| 0.52 | None | 120 | 61 |
| 0.52 | 2.0 mole % of ceric ammonium nitrate | 7 | 55 |
| 0.52 | 2.0 mole % of lanthanum nitrate | 25 | 63 |
| 0.52 | 2.0 mole % of indium nitrate | 28 | 63 |
| 0.26 | 2.0 mole % of cadmium chloride | 31 | 65 |
| 0.26 | 5.0 mole % of cadmium chloride | 19 | 65 |
| 0.26 | 5.0 mole % of cadmium chloride | 9 hours to absorb 0.45 mole O₂ | 65 |

From the data in Table IV, it will be seen that the use of the promoters of this invention permits a substantial decrease in the amount of catalyst that is used without adversely affecting the yield of the time required for the oxidation of the hydroxybenzyl alcohol.

EXAMPLE 5

To a solution prepared by dissolving 124 parts (1.0 mole) of o-hydroxybenzyl alcohol in 700 parts of water were added varying amounts of sodium hydroxide, sodium borate, and tetrammine cadmium hydroxide. After the addition of a 5 percent platinum-on-graphite catalyst, the reaction mixture was contacted with oxygen at about one atmosphere pressure at 25°–30 C. in a closed system until 0.50 mole of oxygen had been absorbed. The reaction mixture was filtered to remove the catalyst, acidified with sulfuric acid, and steam distilled to separate an organic layer. Distillation of this layer yielded salicylaldehyde and reaction by-products.

The amounts of reactants used and the results obtained are summarized in Table V.

TABLE V

| Amt. of platinum added (parts/mole) | Moles NaOH per mole hydroxybenzyl alcohol | Moles NaH₂BO₃ per mole hydroxybenzyl alcohol | Mole percent Cd(NH₃)₄⁺² | Time for absorption of 0.5 mole O₂ (hours) | Percent salicyl aldehyde | Percent salicylic acid | Percent tar |
|---|---|---|---|---|---|---|---|
| 0.52 | 2 | 0 | 0.19 | 2.25 | 82.1 | 2.1 | 16.7 |
| 0.52 | 1 | 1 | 0.19 | 9 | 74.7 | | 27.8 |
| 0.26 | 2 | 0 | 0.19 | 4.75 | 76.0 | | 27.8 |
| 0.26 | 1 | 1 | 0.19 | 15 | 71.5 | | 28.4 |
| 0.26 | 1 | 0 | 0.19 | 18 | 41.3 | | 53.8 |
| 0.26 | 2 | 0 | 0 | 116 | 66.0 | | 32.8 |

The data in Table V show that at both catalyst levels the highest yield of salicylaldehyde was obtained in the shortest time when the reaction mixture contained 2 moles of sodium hydroxide per mole of hydroxybenzyl alcohol and 0.19 mole percent of the promoter.

The terms and expressions which have been employed are used as terms of description and not of limitation. There is no intention in the use of such terms and expressions of excluding any equivalents of the features shown and described or portions thereof, but it is recognized that various modifications are possible within the scope of the invention claimed.

What is claimed is:

1. In the process for the production of hydroxybenzaldehydes wherein a hydroxybenzyl alcohol having the structural formula

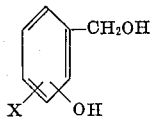

wherein X represents hydrogen, a lower alkyl group, or a lower alkoxy group, in an aqueous medium at a temperature in the range of 0° to 100° C. is contacted with an oxygen-containing gas in the presence of a platinum catalyst, the improvement wherein at least 0.1 mole percent of a cationic oxidation promoter selected from the group consisting of cadmium, tetrammine cadmium, cerium, indium, lanthanum, cuprous, cupric, yttrium, magnesium, uranyl, or zinc ions, based on the hydroxybenzyl alcohol, is present in the reaction medium.

2. The process of claim 1 wherein 0.15 to 2 mole percent, based on the hydroxybenzyl alcohol, of the cationic oxidation promoter is present in the reaction medium.

3. The process of claim 1 wherein the cationic oxidation promoter comprises cadmium, tetrammine cadmium, cerium, indium, or lanthanum ions.

4. The process of claim 1 wherein the cationic oxidation promoter that is added to the reaction medium is a cadmium, cerium, indium, or lanthanum hydroxide, oxide, chloride, nitrate, or borate.

5. The process of claim 1 wherein the cationic oxidation promoter is the tetrammine cadmium ion, Cd(NH₃)₄⁺².

6. The process for the production of salicyl-aldehyde that comprises the following steps:
 a. Forming a reaction mixture that comprises a 10 to 30 percent aqueous solution of o-hydroxybenzyl alcohol, 0.3 to 3 moles of an alkali metal hydroxide or borate per mole of o-hydroxybenzyl alcohol, 0.15 to 1.5 grams of platinum per mole of o-hydroxybenzyl alcohol, and 0.001 to 0.10 mole per mole of o-hydroxybenzyl alcohol of a cationic oxidation promoter selected from the group consisting of cadmium, cerium, indium, tetrammine cadmium, lanthanum, copper, yttrium, magnesium, uranium, and zinc hydroxides, oxides, chlorides, nitrates, sulfates, and borates;
 b. Contacting said reaction mixture at a temperature in the range of 0° to 100° C. with an oxygen-containing gas until the theoretical amount of oxygen has been absorbed; and
 c. Isolating salicylaldehyde from said reaction mixture.

7. The process of claim 6 wherein the reaction mixture is made alkaline by the presence of 0.3 to 3 moles of an alkali metal hydroxide per mole of hydroxybenzyl alcohol.

8. The process of claim 6 wherein the reaction mixture is maintained at 20°–40° C. during the oxidation.

9. The process of claim 6 wherein the oxidation promoter that is present in the reaction mixture is cadmium hydroxide.

10. The process of claim 6 wherein the oxidation promoter that is present in the reaction mixture is tetrammine cadmium hydroxide.

11. The process of claim 6 wherein the oxidation promoter is ceric ammonium nitrate.

12. The process of claim 6 wherein the oxidation promoter is lanthanum nitrate.

13. The process of claim 6 wherein the oxidation promoter that is added to the reaction mixture is cadmium chloride.

14. The process of claim 6 wherein the oxidation promoter is indium nitrate.

15. The process of claim 6 wherein the oxygen-containing gas is air.

\* \* \* \* \*